June 5, 1951  R. PUDELKO  2,555,508
MOTOR DRIVEN SWITCH
Filed May 31, 1946
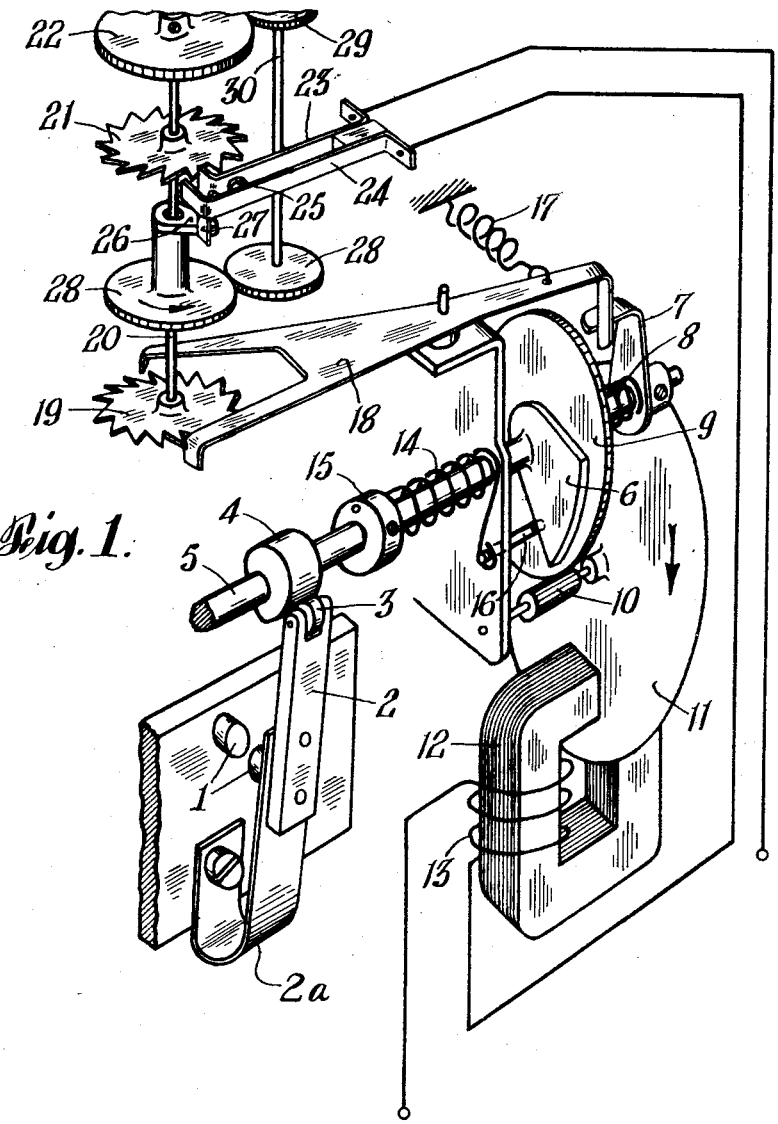
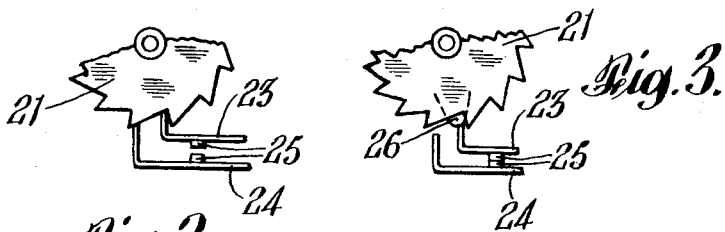
INVENTOR.
RICHARD PUDELKO
BY Morgan, Finnegan & Durham
ATTORNEYS Patented June 5, 1951

2,555,508

UNITED STATES PATENT OFFICE 2,555,508

MOTOR-DRIVEN SWITCH

Richard Pudelko, Zug, Switzerland, assignor to Landis & Gyr, A. G., a body corporate of Switzerland Application May 31, 1946, Serial No. 673,451
In Switzerland June 22, 1945

11 Claims. (Cl. 175—375)

The present invention relates to control equipment for motor actuated switches and more particularly to mechanism for timing the closing of such switches.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a perspective view of a typical and illustrative embodiment of the present invention;

Figure 2 is a top elevation of a portion of the auxiliary switch mechanism shown in Figure 1 certain of the elements being shown in a different operating position; and Figure 3 is a top elevation of the mechanism shown in Figure 2 the elements of the switch being shown in a third operating position.

In supply networks for the distribution of electric power the consumer circuits are switched on and off by switches of the motor-actuated type. The consumer circuit switches are arranged to be switched off when the mains voltage falls to a sufficiently and predetermined low point due to trouble somewhere in the system or when the supply network is switched off. When the trouble has been corrected or the supply network has been switched on again, all of the consumer circuit switches are switched on again substantially simultaneously. There is thus a very rapid increase of load on the network when the consumer circuits are connected, and this may trip the main switches in the power network, initiating new trouble in the system, and this condition is naturally highly undesirable.

It is an object of the present invention to overcome the difficulties in a power system outlined above by the provision of a motor actuated switch for the consumer circuits which may have a timed actuation or closing so as not to close simultaneously with all other consumer circuit switches. A further object of the invention is the provision of a motor actuated switch which may have a timed actuation or closing which may be adjusted so as to vary the time or delay in actuation, so that the switch may be conveniently utilized with other similar switches in gradually increasing the voltage load on a power network.

In order to realize the above and other objects there is provided in accordance with the present invention a motor actuated switch in which the switch motor, which is actuated through a progressive switching mechanism, drives a member which influences an auxiliary switch controlled by said progressive switching mechanism, the auxiliary switch being connected in series with the coil of the switch motor. The device is so arranged that when the switch motor is turned on, it is caused to oscillate by the successive opening and closing of the auxiliary switch brought about by the progressive switching mechanism, until a member thus moved onwards prevents the auxiliary switch from being opened again, and thus allows the switch motor to complete the movement for closing the switch. There is then switched on such part of the main network as is controlled by the motor actuated switch, and the elements of the device are preferably so made that the time of oscillation of the switch motor before the switch is finally closed may be varied by the replacement of certain parts.

It will be understood that the foregoing general description and the following detailed description as well are exemplary and explanatory of the invention but are not restrictive thereof.

Referring now in detail to the illustrative embodiment of the present invention shown by way of example in the accompanying drawings the switch contacts are designated 1 in Figure 1, it being understood that other contacts may be provided actuated by the same mechanism as that shown for the contacts 1. The spring member 2a carrying the moving contact 1 is mounted on an arm 2 which bears through its roller 3 against a cam 4 on the control shaft 5 of the switch. A friction plate 6 and driver arm 7 are rigidly mounted on control shaft 5 for rotation therewith, and a coiled spring 8 presses a pinion 9 against friction plate 6. The pinion 9 is mounted on shaft 5 for free and independent rotation with respect thereto. Pinion 9 meshes with a small pinion 10 secured to the shaft of the driving disc 11 of a Ferraris motor, the core 12 of which carries a coil 13. A recoil spring 14 is arranged surrounding shaft 5 and has one end attached to a collar 15 which is secured to the shaft and the other end to a pin 16 on a stationary framework which journals shaft 5. Pin 16 also serves as a stop for friction plate 6 when the switch contacts 1 are in open position, as shown in Figure 1 of the drawings.

When the switch is in open position the driver arm 7 bears against a pallet lever 18 which is urged in the opposite direction and against the arm 7 by means of a spring 17 connecting the pallet lever and any convenient stationary part of the device. The pallets of lever 18 engage with the ratchet pinion 19 of a progressive switching mechanism. Ratchet pinion 19 is fixed to a shaft 20, which also carries a control pinion 21 and a gear wheel 22 fixed with respect thereto. The flanks of the teeth on the control pinion 21 provide surfaces against which the bent ends of contact carriers 23 and 24 are adapted to bear. Carriers 23 and 24 have contacts 25, forming an auxiliary switch connected in series with coils 13 of the Ferraris switch actuating motor.

A cam 26 is mounted on shaft 20 for free and independent rotation with respect thereto, and a lug 27 depending from contact carrier 23 extends into the path of the cam. Interengaging pinion gears 28 are provided, the one carrying cam 26 for rotation therewith and the other secured to the lower end of a lay shaft 30. At its upper end the shaft 30 carries pinion 29 meshing with gear 22, so that the cam 26 is turned through actuation of shaft 20 by pallet lever 18.

In Figure 1, as has been pointed out, the switch is shown in the off position, the contacts 1 being separated and the recoil spring 14 keeping friction plate 6 against pin 16. Driver arm 7 holds pallet lever 18 with the front pallet (as seen in Fig. 1) in engagement with ratchet pinion 19, and contact carrier 23 bears against the flank of a tooth of control pinion 21, the other contact carrier 24 of the auxiliary switch is disengaged from pinion 21. The contact members 25 are thus in engagement and the auxiliary switch in the circuit of coil 13 of the switch motor is closed.

When the power network is switched on a voltage is applied to switch motor 11, 12, 13 and its driving disc begins to rotate in the direction indicated by the arrow thereon in Figure 1 of the drawings, turning control shaft in opposition to the action of spring 14. At the same time the driver arm 7 releases the pallet lever 18 and spring 17 swings it so that the rear pallet is brought into engagement with ratchet pinion 19 and advances it by one tooth. The rotation of control pinion 21 thus brought about causes contact carrier 23 to slide over the tip of the tooth against which it previously bore and to come to rest in the trough between two teeth. Contact carrier 24 likewise comes to bear against the flank of a tooth of the control pinion and the contact parts 25 are separated and the auxiliary switch opened, as shown in Fig. 2 of the drawings. The supply of current to the switch motor 11, 12, 13 is thus shut off, and recoil spring 14 then returns shaft 5 to its original position. The turning of shaft 5 by the initial actuation of the motor is insufficient to close contacts 1, and the reciprocating movement of the switch motor and shaft 5 does not affect the supply network.

The return of shaft 5 to its original position by spring 14 causes driver arm 7 to actuate the pallet lever 18, and this again advances ratchet pinion 19 by one tooth, so that the auxiliary switch members 23 and 24 come to occupy a position with respect to control pinion 21 similar to that shown in Fig. 1, closing the auxiliary switch. The switch motor once more begins to rotate, but the driving disc 11 again makes only a part of a revolution whereupon the auxiliary switch 25 is again broken and the shaft 5 returned, as already described.

As this oscillatory movement of the motor and control shaft continues cam 26 is brought during the rotation of motor 11, 12, 13 to bear against the lug 27 of contact carrier 23, so that the latter cannot extend into the trough between two teeth of control pinion 21 as shown in Figure 2. The auxiliary switch elements then occupy a position shown in Figure 3 of the drawings, carrier 23 engaging cam 26 and holding carrier 24 through engaging contacts 25 away from the teeth of control pinion 21. The motor 11, 12, 13 now continues its driving movement of shaft 5, and the roller 3 rolls over cam 4 onto the surface of the latter with the minimum throw, so that contacts 1 are engaged and the switch is closed. Because of the loose coupling between the friction plate 6 and the pinion 9 and, furthermore, because of the force exerted by the stationary contact of the switch 1 against the movable contact of the switch, the friction plate 6 will slip with respect to the pinion 9 if the pinion should continue to rotate. The switch 1 will therefore remain closed until the mains voltage falls below a predetermined value.

When the network circuit is again broken, motor 11, 12, 13 becomes "dead", or unenergized, and is reversed by spring 14. Shaft 5 is also reversed and turns cam 4 to break switch contacts 1. Driver arm 7 swings pallet lever 18 so that pinion 19 is advanced one step, cam 26 is carried beyond lug 27, and the auxiliary switch is closed. When the network is switched on the operation of the switch as already described is repeated.

It will be apparent that the gear train 28, 29 on shaft 30 may be replaced by another of a different transmission ratio, and the period of oscillation prior to closing of switch 1 may thus be varied.

From the foregoing description of the motor actuated switch of the present invention it will be apparent that the switches allotted to different consumers, or groups of consumers, in a power distributing network may be switched on successively by adjusting the retardation of the individual switches as desired. In this way an unduly rapid increase in the loading of the network may be avoided.

The invention in its broader aspects is not limited to the specific mechanisms shown and described but departures may be made therefrom within the scope of the accompanying claims without departing from the principles of the invention and without sacrificing its chief advantages.

What I claim is:

1. In combination, a switch, a motor connected to said switch to operate it upon continuous actuation of the motor for a predetermined period of time, means normally interrupting actuation of said motor short of said predetermined period of time, and other means for interfering with normal operation of said first means after a predetermined number of such interruptions to maintain continuous actuation of said motor for said predetermined period of time.

2. In combination, an electric motor, a switch connected thereto to be closed by said motor when the latter is actuated for a sufficient period of time, an auxiliary switch in the circuit of said motor and actuated thereby to interrupt actuation of said motor in a period of time after initial actuation insufficient to close said first switch, and means also actuated by said motor to maintain after a predetermined number of such interruptions said auxiliary switch closed for a period of time sufficient to allow said motor to close said first switch.

3. In combination, an oscillatable electric motor having a normal period of oscillation, a switch connected to said motor to be operated thereby upon a greater than normal period of oscillation of said motor, and means for imparting a greater than normal period of oscillation to said motor after a predetermined number of oscillations thereof.

4. In combination an electric motor, means for actuating said motor a predetermined period of time, means for reversing said motor, after actuation, to its initial position, a switch connected to said motor to be closed thereby upon actuation of said motor for a greater than said predetermined period of time, and means for actuating said motor for a greater than said predetermined period of time after a predetermined number of actuations of said motor for said predetermined period of time.

5. In combination, an electric motor, a switch connected thereto to be closed by said motor when the latter is actuated for a sufficient period of time, an auxiliary switch in the circuit of said motor and actuated thereby to interrupt actuation of said motor in a period of time after initial actuation insufficient to close said first switch, and replaceable means also actuated by said motor after a predetermined number of such interruptions thereof to maintain said auxiliary switch closed for a period of time sufficient to allow said motor to close said first switch.

6. In combination an electric motor, a switch connected thereto to be closed thereby upon uninterrupted actuation of said motor for a predetermined period of time, interrupting means connected to said motor and driven thereby including an auxiliary switch connected in series with the motor to be opened and interrupt the actuation of said motor in less than said predetermined period of time after actuation, means for reversing said motor to its initial position after interruption of actuation, means for closing said auxiliary switch upon reversing said motor, and means driven by the motor for preventing the opening of said auxiliary switch after a predetermined number of such interruptions of said motor whereby said motor is actuated for said predetermined period of time.

7. In combination, an electric motor; a switch connected thereto to be closed thereby upon uninterrupted actuation of said motor for a predetermined period of time; means for interrupting actuation of said motor in less than said predetermined period of time after actuation including a pallet lever pivoted by movement of said motor, a ratchet pinion to be turned by said lever, a control pinion connected to said ratchet pinion for rotation therewith, and an auxiliary switch having arms to engage said control pinion, said switch being connected in series to said motor to be opened to interrupt said motor; means for reversing said motor to its initial position after interruption of actuation reversely pivoting said pallet lever and closing said auxiliary switch; and means for preventing the opening of said auxiliary switch after a predetermined number of such interruptions of said motor whereby said motor is actuated for said predetermined period of time.

8. In combination, an electric motor; a switch connected thereto to be closed thereby upon uninterrupted actuation of said motor for a predetermined period of time; means for interrupting actuation of said motor in less than said predetermined period of time after actuation including a pallet lever pivoted by movement of said motor, a ratchet pinion to be turned by said lever, a control pinion connected to said ratchet pinion for rotation therewith, and an auxiliary switch having arms to engage said control pinion, said switch being connected in series to said motor to be opened to interrupt said motor; means for reversing said motor to its initial position after interruption of actuation reversely pivoting said pallet lever and closing said auxiliary switch; and means for preventing the opening of said auxiliary switch after a predetermined number of such interruptions of said motor whereby said motor is actuated for said predetermined period of time, said means including a cam driven from said ratchet pinion to engage one of said auxiliary switch arms.

9. In combination, an electric motor; a switch connected thereto to be closed thereby upon uninterrupted actuation of said motor for a predetermined period of time; means for interrupting actuation of said motor in less than said predetermined period of time after actuation including a pallet lever pivoted by movement of said motor, a ratchet pinion to be turned by said lever, a control pinion connected to said ratchet pinion for rotation therewith, and an auxiliary switch having arms to engage said control pinion, said switch being connected in series to said motor to be opened to interrupt said motor; means for reversing said motor to its initial position after interruption of actuation reversely pivoting said pallet lever and closing said auxiliary switch; and means for preventing the opening of said auxiliary switch after a predetermined number of such interruptions of said motor whereby said motor is actuated for said predetermined period of time, said means including a cam to engage one of said auxiliary switch arms and gearing means between said ratchet pinion and said cam.

10. In combination, an electric motor; a switch connected thereto to be closed thereby upon uninterrupted actuation of said motor for a predetermined period of time; means for interrupting actuation of said motor in less than said predetermined period of time after actuation including a pallet lever pivoted by movement of said motor, a ratchet pinion to be turned by said lever, a control pinion connected to said ratchet pinion for rotation therewith, and an auxiliary switch having arms to engage said control pinion, said switch being connected in series to said motor to be opened to interrupt said motor; means for reversing said motor to its initial position after interruption of actuation reversely pivoting said pallet lever and closing said auxiliary switch; and means for preventing the opening of said auxiliary switch after a predetermined number of such interruptions of said motor whereby said motor is actuated for said predetermined period of time, said means including a cam to engage one of said auxiliary switch arms and replaceable gearing means between said ratchet pinion and said cam.

11. In combination, a switch, a motor connected to said switch to operate it upon continuous actuation of the motor for a predetermined period of time, means normally interrupting actuation of said motor short of said predetermined period of time, means for returning said motor to its unactuated position during each interval of interruption, and means for interfering with the normal operation of said interrupting means at regular intervals of operation thereof during the return of said motor to its original position.

RICHARD PUDELKO.

REFERENCES CITED

The following references are of record in the file of this patent:

UNITED STATES PATENTS

| Number | Name | Date |
|---|---|---|
| 2,420,577 | Van Lew | May 13, 1947 |